March 5, 1968  R. H. THORNER  3,371,674
FLUID GOVERNOR OR CONTROLLER
Filed April 1, 1966
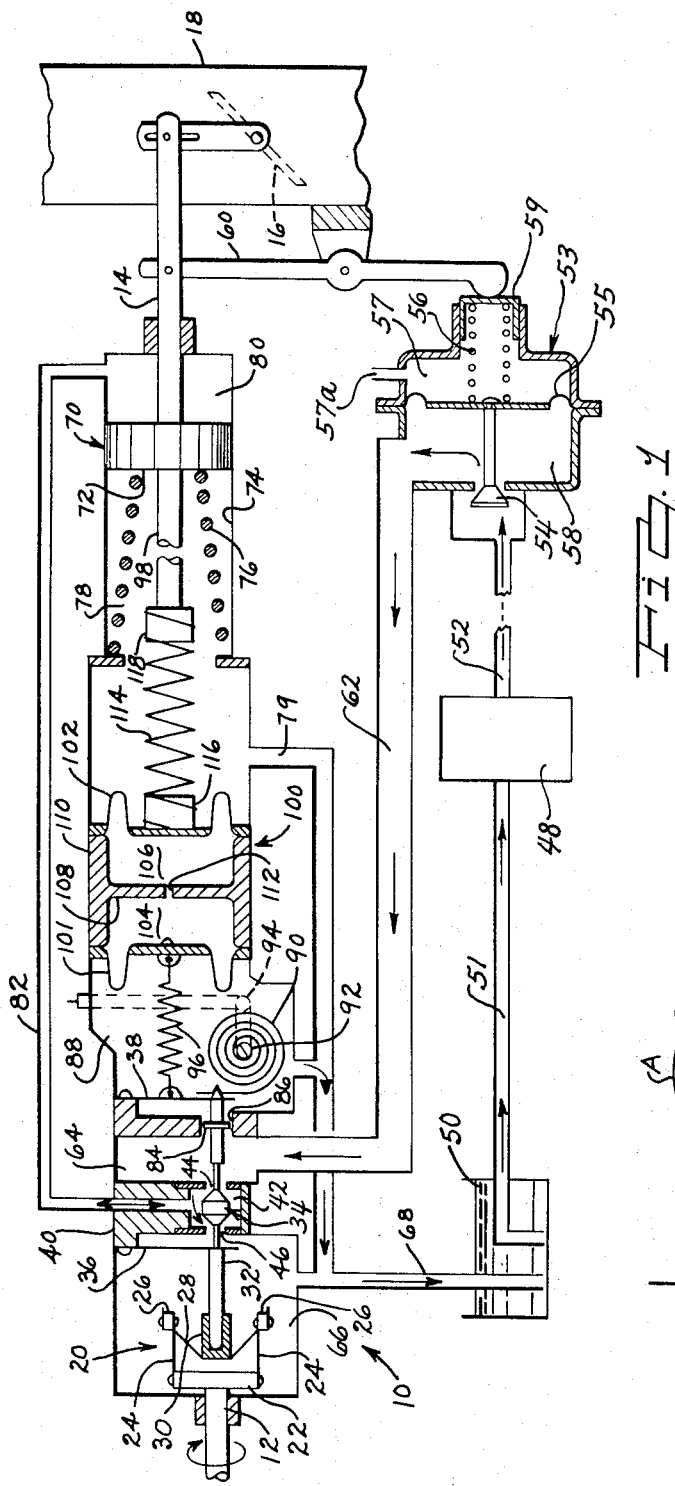
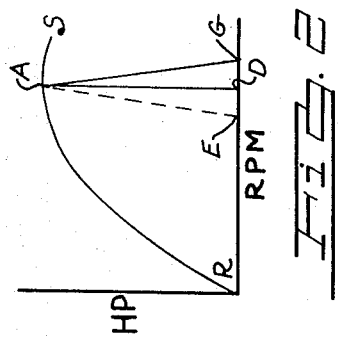
INVENTOR.
ROBERT H. THORNER

United States Patent Office 3,371,674
Patented Mar. 5, 1968

3,371,674
FLUID GOVERNOR OR CONTROLLER
Robert H. Thorner, 8750 W. Chicago Blvd., Office F, Detroit, Mich. 48204
Continuation-in-part of application Ser. No. 463,319, June 11, 1965. This application April 1, 1966, Ser. No. 539,358
12 Claims. (Cl. 137—36)

This invention relates to a fluid control device for automatically regulating any controlled condition, such as a governor device for controlling the speed of an internal combustion engine or other machine having rotating means to be controlled. The present application is a continuation-in-part of application Ser. No. 463,319, filed June 11, 1965, now Patent No. 3,257,914, which in turn was a continuation of my application Ser. No. 238,575, filed Nov. 19, 1962 entitled, "Fluid Governor or Controller" (now abandoned) which was a continuation-in-part of my application Ser. No. 687,241, filed Sept. 30, 1957, now Patent No. 3,092,084 and Ser. No. 815,177, filed May 22, 1959, now Patent 3,068,849.

Governors currently in use for precisely controlling the speed of a prime mover, such as a diesel engine, are mostly of the servo-mechanism type having oil powered servo-motor controlled by a pilot valve actuated by a centrifugal flyweight mechanism. The pilot valve usually comprises a spool slidable in a bore to cover or uncover ports that direct pressure oil from a source to the servo-motor and/or permits oil to drain from the servo-motor as required in normal speed regulating movements. For precision or "isochronous" governors (constant speed at all loads), the presently known devices provide a pilot valve action in which the valve must always be in a fixed or neutral axial position to hold a given set speed; and for changes in speed the pilot valve must deviate or make "excursions" away from its neutral position to provide intermittent fluid forces on the servo-motor tending to restore the speed, whereupon the pilot valve returns to its neutral position. With this type of controller system, a "speeder-spring" balances the pilot valve position against the centrifugal force of the flyweights or other speed-responsive means. Since the system is balanced in only one axial position which occurs at only one force of the speeder spring for a set position of the speeder-spring-control-lever, the flyweights will balance this force at only one speed. Hence, the governor is inherently isochronous at each position of the speeder-spring-control lever, but provides a different isochronous speed at each different position of the control lever.

The governor described thus far, although isochronous, also tends to be inherently unstable for several reasons. Firstly, the pilot valves conventionally used are non-modulating and produce a sudden increase in pressure on the servo-motor when the pilot valve moves away from its balanced neutral position. This action causes the servo-motor to "get ahead" of the movement of the pilot valve or to "over-control" the engine which produces surging. Secondary, this over-control is made worse because of the relatively large mass of the pilot valve and flyweights, which mass affects the speed of response of the elements and thus the correcting return movement to "catch" the servo-motor in time to prevent excessive over-control. But, thirdly, one of the most important factors contributing to such over-control of the servo-motor is the static and dynamic friction in the flyweight and pilot valve, as well as its compensating system, which cause minute delays in the speed-correcting action thereof.

In present governors the inherent instability above described is overcome by the addition of "compensating" systems. These systems usually comprise a piston operated by the servo-motor to apply a temporary oil pressure (by bleeding trapped oil) acting on another piston connected directly or through a spring to either the pilot valve itself, or to an axially-movable sleeve having ports cooperating with the pilot valve, or to a lever connected to the pilot valve, all in a manner well known to those skilled in the art. The action is such that when the pilot valve deviates from its neutral position and the servo-piston first moves to restore the engine speed, an oil pressure is produced (on the pilot valve or its sleeve) to instantly return the pilot valve to a neutral position in relation to its sleeve which stops further movement of the servo-motor. An adjustable delay bleed is provided to permit this temporary pressure to dissipate; then the pilot valve can deviate again from its neutral position to cause another "step" movement of the servo-motor, and so on, until the speed is corrected. This action causes the servo-motor to move in fast incremental "steps" to prevent over-control, and stability is achieved since in in each step a temporary speed droop is produced. To set the governor initially, the opening of the delay bleed is increased until the engine surges and is then closed sufficiently to stop the surging.

Such compensating systems have several undesirable characteristics. The above descrbied compensating "step" action tends to slow down the movement of the servo-motor and thus causes a speed deviation with a sudden change in load. The more the delay bleed must be closed, the slower will be the servo-motor action and the greater will be the speed deviation produced with a sudden change in load. It is recognized that the lower the mass and friction of the pilot valve and flyweight, the less compensation is necessary and as a result the delay bleed need not be so restrictive. To this end, present governors have their pilot valves, flyweights, compensating pistons or sleeves, etc., made of hardened precision-ground materials with anti-friction bearings used freely throughout. Also, in many instances the pilot valves and compensating pistons, or sleeves are mechanically rotated by added driving mechanism in an attempt to reduce friction. These expedients do not eliminate the problems but merely reduce their effect. The pilot valves and compensating pistons of conventional governors have clearances measured in ten-thousandths of an inch, and their rotation not only requires complex and costly added mechanism but still are subjected to the surface tension of the oil in speed-responsive movements. Much worse, one of the main problems of such hydraulic governors is the deposit of gum or dirt particles which form between the close-fitting surfaces of the pilot valve or compensating piston and their respective sleeves, thereby making the movement of the parts somewhat erratic and reducing the reliability of the governors.

Substantially the same problems exist in the regulation of other controlled conditions, such as temperature, velocity, pressure, position of a member, etc., and the same expedients used for the improvement and refinement of speed governors are used in such other "closed loop" control devices.

In another type of fluid controller in which the pilot valve modulates the pressure directed to a single-acting servo-motor and is biased by a speeder spring, a permanent speed droop is inherently produced in stable governor operation. Such governors are inherently unstable at isochronous operation. In my governor devices of this type, I have been able to provide isochronous operation by including in this combination a re-set means (such as a spring) operated as a function of the position of the control member. Examples of my governors of this type which are capable of stable isochronous operation are shown in FIG. 8 of my said co-pending application Ser. No. 687,241 and in Ser. No. 815,177, and also in my Patent No. 2,887,998 issued May 26, 1959. While these governors represent a substantial improvement in the art primarily because of their frictionless characteristics and low cost, if the speed droop is reversed (lower speed at lower loads) in any portion of the "loading" curve, the governors become unstable in this portion. Thus, my previous governors above discussed have desirably improved the limit of stability from a forward speed droop (such as A–G in FIG. 2) to isochronism (A–D). These governors primarily are intended for automotive use in which cost is highly critical. The governor of the present invention will usually be utilized in applications requiring closer regulation although the cost is somewhat higher, or would be used for stationary, marine, or railroad engines, gas turbines, atomic engines, etc.; or as any precise controller for regulating any controlled condition such as temperature, pressure, velocity, humidity, etc.

A main object of the present invention is to provide a speed governor, or other control apparatus to regulate any controlled condition, in which means are provided to produce stability with all speed droops, including reverse speed droops (A–E in FIG. 2), thereby to provide substantially a surgeless governor or controller.

All governors or similar controllers, even when considered "stable," are constantly moving back and forth slightly to maintain the controlled condition. The better and smoother the governor or controller, the smaller will be these minute oscillations. My governors above discussed are so fast in responding to the speed-change signal, that these undesirable effects are negligible. A second object of the present invention is to provide a speed governor, or other control apparatus to regulate any controlled condition, in which means are provided to substantially reduce the amount which the (engine) control member deviates from a desired position during stable operation of the governor, thereby providing a very "smooth" engine operation when the governor is "stable."

Further objects and advantages of the invention will be apparent from the following description, taken in connection with the appended drawings in which FIG. 1 is a diagrammatic view of the governor embodying the present invention and FIG. 2 is a reference chart.

While the present invention is described with reference to its application on an internal combustion engine as a governor regulating the speed thereof, it will be understood that the invention is not limited thereto, and that it is fully applicable to other installations such as for gas engines, steam engines, or gas turbines, etc. My improved governor or controller may also be used for regulating other devices in response to speed, or in response to any controlled condition, as will be described.

In the drawings there is shown by way of example one form of governing mechanism embodying the present invention. Referring to FIG. 1, the governor 10 is illustrated as including an input shaft 12 operatively connected to and driven by an element (not shown) rotating as a function of the speed of an engine or machine (not shown). An output shaft 14 of the governor is operatively connected to transmit axial movements of the shaft to regulate the control member, which in the example shown comprises a throttle 16 to regulate the flow of air to the engine in a passage 18.

The governor includes means to produce a force varying as a function of the rotary speed of an element of the engine. In the example illustrated in FIG. 1, a frictionless centrifugal flyweight device 20 of the type disclosed in my said co-pending application, Ser. No. 687,241 is shown. This flyweight device comprises a base member 22, either secured to or made as a part of the shaft 12, which has suitably secured thereto a pair of leaf springs 24. The leaf springs 24 carry a pair of flyweights 26 which are joined by a frictionless flexible strip or string-like material such as a piece of spring (music) wire 28 of generally U-shape suitably secured to the weights. The wire has secured thereto at its central portion a force-transmitting cup 30 having a cylindrical bore for rotation about a rod or cylindrical shaft 32. The shaft is constrained from rotation by leaf spring means to be described and has a rounded or pivot end for abutting contact with the bottom or end of the bore of cup 30. Rotation of shaft 12 causes weights 26 to produce a force and move radially outward to impart a rightward force on (and movement of) the cup 30 tending to move shaft 32 axially in a rightward direction, all as viewed in FIG. 1. The bending action of the leaf springs 24 and wire 28 is frictionless; also any eccentricity or misalignment of shaft 32 with respect to shaft 12 is accommodated by longitudinal and torsional bending of wire 28. In this manner, the production and transmission of axial forces and movements to the shaft 32 is accomplished without friction irrespective of production variations. A more detailed explanation of this flyweight mechanism is made in my said co-pending application, Ser. No. 687,241.

The rod or shaft 32 is suitably secured, as by pressing or soldering to a pilot valve 34, and is carried thereby. The pilot valve is supported for frictionless axial swingable movements by a pair of spaced substantially parallel leaf springs 36 and 38 suitably secured at one end thereof to a portion of the governor housing, as by screws. The free ends of both leaf springs are secured to the pilot valve as shown in FIG. 1 by suitable means, as by pressing or soldering, all as disclosed in more detail in my said co-pending application, Ser. No. 687,241.

The main body of the pilot valve is suspended by leaf springs 36 and 38 within a chamber 42. The valve body includes a pair of conical faces for cooperating with a fluid inlet orifice 44 and a fluid outlet orifice 46 to form two variable restrictions, so that chamber 42 is provided with oppositely varying inlet and outlet restrictions, or valves.

Any fluid may be used in the governor of the present invention, so that the instrument will operate satisfactorily with either air or liquid under pressure (or vacuum) supplied to the pilot valve. Accordingly, it is to be understood that when the term "pressure fluid circuit" or just "fluid circuit" is used herein, it refers either to liquid or gas under positive or negative (vacuum) pressure.

In FIG. 1, by way of example, liquid such as oil is supplied by a conventional gear pump 48 having the usual by-pass conduit and relief valve (not shown) to maintain a substantially constant pressure at the pump outlet. The pump is fed fluid such as oil from a reservoir 50 through an inlet conduit 51. The outlet of the pump is transmitted through a conduit 52 to a pressure regulator mechanism 53 which acts to maintain a constant pressure at the inlet orifice 44, which constant pressure varies as a function of the position of throttle 16. In the form shown, the regulator mechanism comprises a valve 54 operated by a pressure responsive member such as a diaphragm 55 biased by a spring 56. Diaphragm 55 forms an atmospheric pressure chamber 57 (vented through port 57a) and a pressure chamber 58. A spring retainer 59 is actuated by a link 60 which is operated by throttle linkage 14 to increase the force of spring 56 as the throttle closes, and conversely. A conduit 62 transmits the pressure-regulated fluid from chamber 58 to chamber 64 without restriction, by making the conduit large enough to preclude line loss; in this manner, the regulator always controls the pressure at orifice 44. At any position of throttle 16, if the pressure tends to increase in chamber 58 for any reason, diaphragm 55 reduces the opening of valve 54 to restore the original pressure set by spring 56 and conversely. Similarly, at different throttle positions, a different constant pressure is maintained to balance the changed force of spring 56. The flow of fluid through the governor circuit is as follows: the fluid flows from pump 48 past valve 54, through the conduit 62 through inlet chamber 64, past orifice 44, through chamber 42, past orifice 46, into atmospheric outlet chamber 66 and through return conduit 68 to reservoir 50. When the pilot valve moves rightwardly, as viewed in FIG. 1, the aperture of orifice 44 gradually reduces while the aperture of orifice 46 gradually increases, which action causes the pressure in chamber 42 gradually to decrease. A leftward movement of the pilot valve causes a reverse action which effects an increase of pressure in chamber 42.

The governor output shaft 14 is actuated by a servo-motor 70 comprising a piston 72 axially slidable in a cylinder 74 and biased in a throttle-closing direction by a servo-power-spring 76. One side of the piston 72 is exposed to atmospheric pressure in a chamber 78 which communicates with conduit 68 through a conduit 79. The right side of piston 72 is exposed to modulated fluid pressure in a chamber 80 which communicates through a conduit 82 with chamber 42. Thus, the pressure existing in chamber 42 are statically transmitted to chamber 80 to effect a desired movement of piston 72. Hence, a rightward movement of the pilot valve reduces pressure in chamber 80 to enable spring 76 to reduce the opening of throttle 16. A leftward movement of the pilot valve increases pressure in chamber 80 to overpower spring 76 which increases the throttle opening.

A disk 84 is carried by the pilot valve shaft and disposed within a cylinder 86 to provide a diametrical or perimetrical clearance of about .003–.005″, for example, with respect to the cylinder. The disk balances the area of the pilot valve exposed to the pressure in chamber 64 in a predetermined manner so that the pressure variations in chamber 64 do not adversely affect the operation of the governor. The disk may provide another useful purpose to be discussed hereinafter. The disk clearance is provided to maintain the frictionless characteristics of the entire "speed-sensing mechanism"; a slight bleed of fluid past the disk into atmospheric chamber 88 and to drain is necessary to achieve this frictionless operation.

Speeder spring means are provided to act on the pilot valve to bias the forces of the flyweight device. In the form shown in FIG. 1, a spiral or clock-type spring 90 acts without friction on a pointed or pivot end of the pilot valve. A shaft 92 supports the spiral spring which is rotated to "wind" and "unwind" by any suitable means, as by a manually operated lever 94 for example.

The leaf springs 24, 36 and 38 as well as the clock spring 90 and wire 28 may be made of any spring material such as stainless steel, or Phosphor bronze. For best fatigue resistance beryllium-copper is desirable. For the supporting leaf springs, any other sheet material having consistent elasticity may also be used. Strips of such stock have very small resistance to bending perpendicularly to their plane but offer very high resistance to bending within their plane, and more important, are consistent in their action so they are frictionless in operation. Any of the V-type or cross-type leaf springs disclosed in my Patent No. 2,808,042, issued Oct. 1, 1957, and in my said co-pending application Ser. No. 687,241 may be used in place of the supporting leaf springs disclosed herein. The clock spring 90 or any or all of the leaf springs 24, 36 and 38 may be of bi-metal to compensate for any errors produced by changes in the temperature of the oil or in the spring forces of the speeder spring.

In the specification and claims herein, all supporting leaf springs and wires associated with the pilot valve, flyweight, compensation system, or speeder spring are referred to as "substantially" frictionless. These spring elements actually are *completely* frictionless from a practical standpoint, since in extensive tests of the pilot-valve-action by itself when supported by leaf springs, *no lag* or hysteresis could be measured that would affect the governing action. Any intermolecular friction in the material itself can, of course, be disregarded, since it is immeasurably small. The term "substantially" has been used solely in recognition of this minute intermolecular friction.

Now consider the action of the governor described thus far, which would be the same construction and operation as disclosed in FIG. 5 of my Patent No. 2,808,042, issued Oct. 1, 1957. Assuming the governor operating in a stable condition, if the speed increases, the flyweights 26 move radially outward so that wire 28 moves cup 30, shaft 32, and pilot valve 34 to the right. Such movement, as above described causes the pressure in chambers 42 and 80 to decrease which enables spring 76 to move throttle 16 in a closing direction tending to restore the governed speed. When the speed decreases from the governed value, the reverse action is produced tending to open throttle 16.

The governor, as described thus far, must produce a normal or "forward" speed-droop (such as 4–7 percent) in order to be stable, as shown by A–G in FIG. 2. The "position-type" pilot valve shown in FIG. 1 must move to (and stay at) new positions as a function of speed in order to effect a corresponding movement of the throttle. This is true because the force of spring 90 increases slightly as the pilot valve moves to the right in order to produce the variable pressures on only one side of the piston 72 to re-position the piston and balance the varying forces of power-spring 76 in this "single acting" servomotor. Thus the pilot valve action is not of the "excursion type" as disclosed in FIG. 1 of my Patent No. 3,051,139, issued Aug. 28, 1962; in this governor the pilot means makes "excursions" from and back to a mid-position to effect "step" movements of a "double acting" servo-motor as described in this patent. FIG. 2 shows a power curve RAS at wide-open-throttle of H.P. and r.p.m. As above discussed, the single acting servo-type governor of the present invention will not be stable at a speed droop less than a predetermined amount, such for example as 2–4 percent, and which will be referred to hereinafter as the "critical speed-droop" beyond the limit of stability. This is shown by A–G in FIG. 2.

Now consider the governor with "re-set" means added which apply forces acting on the pilot valve 34 as a function of the position of the control means. In the example shown in FIG. 1, a re-set spring 96 is illustrated which increases the total rightward force on the pilot valve as the throttle closes, and conversely. For the present, consider the spring 96 as directly operated by the piston 72, and the intermediate mechanism shown in FIG. 1 will be discussed hereinafter. The governor, as now assumed, is substantially the same as disclosed in FIG. 8 of my said co-pending application, Ser. No. 687,241. I have found that this combination of elements (a single-acting servo-motor with a spring-biased modulating pilot valve and a re-set spring) substantially improves the limit of stability. The critical speed-droop is now negative or at least some droop less than zero, since this governor combination can be calibrated to be completely stable at isochronous operation (zero droop), as shown by the "loading" curve A–D in FIG. 2.

The present invention improves the governor operation by adding to the combination, above discussed, a time-delay mechanism 100 between the re-set spring 96 and a shaft 98 connected to piston 72. In the time-delay means illustrated in FIG. 1, a pair of flexible diaphragms 101 and 102 enclose chambers 104 and 106, respectively, formed by a wall 108 of a housing 110. A small orifice 112 connects the two chambers which are entirely filled with a fluid, such as a liquid. The re-set spring 96 is operatively connected to diaphragm 101. A coil delay-spring 114 is secured at one end to a retainer 116 connected to diaphragm 102 and at its other end is secured to a retainer 118 which is part of shaft 98. The delay spring 114 is of low force compared to power spring 76. The re-set spring is also of low force, preferably much lower than the force of the delay spring 114.

The operation of the present governor inventive combination is as follows. When the speed increases above the governed value, flyweight 20 moves pilot valve 34 to the right to move throttle 16 in a closing direction, as above described. This action stretches spring 114 and applies a rightward force on diaphragm 102. Because of the restrictive effect of orifice 112, liquid gradually moves from chamber 104 to 106 so that the rightward movement of diaphragm 101 and extension of re-set spring 96 is caused to delay or lag behind the movement of the control means, throttle 16. The amount of delay or lag is determined by the size of orifice 112, a smaller orifice providing a greater lag. After sufficient oil has transferred from chamber 104 to 106 to equalize the pressures in chambers 104 and 106, the full calibrated re-set force of spring 96 will have been attained corresponding to the position of throttle 16. In this action, as previously discussed, the re-set spring effects a further rightward movement of pilot valve 34 which effects a more closed position of throttle 16 than without the re-set spring. However, with this construction, the force and rate of spring 96 can be selected to cause the throttle to settle at a position providing a governed speed *less* than the original governed speed prior to the speed-increase, thus producing a reverse or negative speed droop, as shown by the "loading" curve A–E in FIG. 2.

Because of the action of the time delay mechanism, the governor is completely stable at this reverse speed droop. This is true because the delay mechanism 100 causes the re-set action of spring 96 to lag behind the movement of control means 16 sufficiently so it can, in effect, first stabilize at a positive (or zero) droop, which is stable as above discussed, and then secondly it is re-set to a lower speed. The action can be better understood by again considering the governor without the re-set spring, as above discussed, in which the droop would be positive with a speed increase as the load decreases to provide stable operation. Then assume that the force of speeder spring 90 is manually reduced sufficiently to reduce the *stable* governed speed below the initial speed at the higher load; this same action is produced by the delay mechanism 100 and re-set spring 96. When the speed decreases from the governed value, the reverse action occurs; flyweight 20 moves pilot valve 34 leftward to effect an opening of throttle 16 which compresses spring 114, and re-set spring 96 is retracted with a lag due to the reverse action of the delay mechanism. This action causes the stable governed speed to be higher than the original speed at the initial lower load (reverse droop) along curve E–A in FIG. 2.

Thus, by properly selecting the size of orifice 112 of the relay mechanism there is *no* limit of stability, and because of this mechanism the governor is in effect truly "surgeless." One highly useful result of this construction is that when the governor is set for isochronous operation, production units would never cause surging if a slight reverse droop is produced in view of production variations. Thus the governor is not critical and can be calibrated if desired with limits of plus or minus a desired isochronous loading curve, such as A–D of FIG. 2. Also, a stable reverse droop is often required, such as in certain motor generator sets.

In any speed regulating mechanism, or similar "closed-loop" control device, it is highly desirable that the friction of all the elements which move in response to speed (and other elements that act thereon) be minimized, or at best entirely eliminated. The total of all these elements that move together in response to speed-changes might be termed the "speed sensing mechanism," and in the control device of the present invention are frictionless in their speed-responsive movements, including all their connections. These elements of the speed-sensing mechanism of the present invention are the leaf springs 24, weights 26, wire 28, shaft 32, pilot valve 34 and its supporting springs 36 and 38, clock spring 90, re-set spring 96, diaphragms 101, 102 and spring 114. Because of the frictionless character and low mass of these elements in their cooperative action, the sensing movements of the flyweights and pilot valve and the compensating movements acting thereon are extremely fast and, more important, consistent with no measurable lag. Hence the speed deviation accompanying a change in load is much less than for conventional governors of this type. This characteristic is further enhanced by the modulating nature of the pilot valve in which the pressure differential "across" the piston 72 *gradually* changes as the pilot valve gradually is moved, thus reducing the tendency for over-control. Equally important, none of the elements of the sensing mechanism of my governor, such as the pilot valve and compensating disk 84 require close fits against mating sliding surfaces. Hence, gum and dirt cannot wedge progressively in the clearances between these surfaces to cause mal-functioning of the governor. This is particularly significant as the governor may be stable when placed in service but becomes unstable as dirt or gum wedges progressively between these surfaces. In my governor the clearances around the pilot valve body can be very large, such as ¼" radially, and the clearance around the disk may be large, such as .003–.005 diametrically. Because of the complete elimination of all close-fits in the sensing mechanism of my governor, its reliability and life are greatly improved over conventional governors.

The governor as described thus far is not only inherently stable but, because of the frictionless characteristics and low inertia is very smooth. But even greater smoothness can be achieved by providing in the inventive combination pressure regulator means 53 to change the pressure of the source fluid flowing to the pilot valve as a function of the position of the throttle in such manner tending to reverse the throttle. In the example illustrated in FIG. 1 and described above, the pressure regulator 53 controlled by link 60 causes the pressure in chamber 64 to increase as the throttle 16 closes, and conversely. The improved stabilizing action of this construction is as follows: At any instantaneous fixed position of the pilot valve (in the sense that the pilot valve movement is a series of instantaneous fixed positions), if throttle 16 tends to close for any reason, the action of pressure regulator 53 increases the pressure in conduit 62 and chamber 64, which correspondingly increases the pressure in chambers 42 and 80 thereby moving piston 72 to return throttle 16 to its original position. If the throttle tends to open at any instantaneous fixed position of the pilot valve for any reason, the reverse stabilizing action is produced. At a different instantaneous fixed position of the pilot valve, the throttle will stabilize in the same manner at a different position. In a sense, this throttle-stabilizing action at instantaneous fixed positions of the pilot valve provides a second pressure-regulating action in the governor. As the throttle deviates in either direction, it operates regulator 53 to maintain constant the pressure in chamber 80 and stabilizing the throttle in the process.

For this throttle-stabilizing concept, in the form shown, the disk 84 compensates for the effects of the variations of pressure in chamber 64 acting at orifice 44 on the exposed face of the pilot valve 34, as previously described. For example, the disk 84 can be used to provide re-set action in place of the spring 96 and delay mechanism 100 by having the area of disk 84 larger than the exposed area of the pilot valve. Then, when the speed increases to effect rightward movement of the pilot valve to reduce the opening of throttle 16, the corresponding increase in pressure in chamber 64 acts on disk 84; since in this example the disk area is larger than the area of the pilot valve, the latter is moved more to the right resulting in a further closure of the throttle. While this construction is simpler and, presumably, less expensive than the spring and time-delay re-set means, it is stable only at isochronous operation and forward speed droops.

It is important to appreciate that while the throttle-stabilizing construction of pressure regulator 53 and link 60 enhances the re-set and time-delay mechanism, and conversely, neither is essential to the other. But the entire combination as disclosed in FIG. 1 provides an extremely smooth and substantially surgeless governor. It is also important to appreciate that the time-delay mechanism and re-set spring can operate with any position-type controller, such as with a direct-acting mechanical-centrifugal speed governor, for example.

Any other type of sensing means to produce forces as a function of speed may be employed in the present invention without changing the scope thereof. It is highly desirable, however, that the means producing forces acting on the pilot valve be frictionless, as is the flyweight shown in FIG. 1. In addition, the controller principles disclosed herein may be employed equally well with frictionless sensing means to regulate any other controlled condition, such as temperature, pressure, humidity, position of a member, liquid level, altitude (such as an airplane, missile or space vehicle), velocity of fluids, viscosity, acceleration, altitude, or any other condition to be controlled.

What is claimed is:

1. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member, valve means in said circuit for controlling pressure therein acting on said pressure responsive member for effecting regulating movements thereof, sensing means responsive to changes in the controlled condition to produce forces varying as a function thereof and acting on said valve means to effect movements thereof for causing said controlled-condition-regulating movements of said pressure responsive member and said control means, and pressure-controlling means including pressure regulator means operatively associated with said control means to vary the magnitude of said source-pressure as a function of the movement of said control means and tending to correspondingly vary said pressure controlled by said valve means in a direction tending to reverse the movement of said pressure responsive member and said control means.

2. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member on one side thereof, valve means in said circuit for controlling pressure therein acting only on said one side of said pressure responsive member for effecting regulating movements thereof, first variable force biasing means opposing the forces of said pressure responsive member produced by said last-named pressure acting thereon, sensing means responsive to changes in the controlled condition to produce forces varying as a function thereof and acting on said valve means to effect movements thereof for causing said controlled-condition-regulating movements of said pressure responsive member and said control means, second variable force biasing means acting on said valve means with a force varying as a function thereof for establishing the operating position of said valve means to establish the desired value of said controlled condition, and pressure-controlling means including pressure regulator means operatively associated with said control means to vary the magnitude of said source-pressure as a function of the movement of said control means and tending to correspondingly vary said pressure controlled by said valve means in a direction tending to reverse the movement of said pressure responsive member and said control means.

3. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member on one side thereof, valve means including a movable valve member in said circuit for controlling pressure therein acting only on said one side of said pressure responsive member for effecting regulating movements thereof, the configuration of said valve member in relation to other elements of said valve means adapted to produce modulated pressures acting on said pressure responsive member to effect movements thereof as a function of the position of said valve member, first biasing means acting on said pressure responsive member with a force varying as a function of the position thereof to oppose the forces produced thereon by said last-named pressure, sensing means responsive to changes in the controlled condition to produce forces varying as a function thereof and acting on said valve means to effect movements thereof for causing said controlled-condition-regulating movements of said pressure responsive member and said control means, second variable force biasing means acting on said valve means with a force varying as a function thereof for establishing the operating position of said valve means to establish the desired value of said controlled condition, and pressure-regulator means including a diaphragm exposed to said source pressure and operatively associated with said control means to vary the magnitude of said source-pressure as a function of the movement of said control means and tending to correspondingly vary said pressure controlled by said valve means in a direction tending to reverse the movement of said control means.

4. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member on one side thereof, two restrictions in said circuit, said pressure responsive member communicating with said circuit at a point between said two restrictions, valve means in said circuit for controlling pressure therein acting only on said one side of said pressure responsive member for effecting regulating movements thereof, said valve means including a movable valve member in said circuit to vary the restrictive effect of at least one of said two restrictions for modulating the pressure in said circuit between said two restrictions transmitted to said one side of said pressure responsive member for effecting movements thereof as a function of the position of said valve member, first biasing means acting on said pressure responsive member with a force varying as a function of the position thereof to oppose the forces produced thereon by said last-named pressure, sensing means responsive to changes in the controlled condition to produce forces varying as a function thereof and acting on said valve means to effect movements thereof for causing said controlled-condition-regulating movements of said pressure responsive member and said control means, second variable force biasing means acting on said valve means with a force varying as a function thereof for establishing the operating position of said valve means to establish the desired value of said controlled condition, and pressure-regulator means operatively associated with said control means to regulate said source-pressure at predetermined values varying as a function of the position of said control means and tending to correspondingly vary said pressure controlled by said valve means in a direction tending to reverse the movement of said control means, said pressure regulator means including means to maintain said source pressure under all conditions at one said predetermined value corresponding to one definite position of said control means and at another said predetermined value corresponding to another definite position of said control means under all conditions, and so on.

5. In a self-regulating control mechanism for automatically controlling a variable condition, the combination of, control means to regulate said controlled condition, a pressure responsive member operatively connected to said control means for actuation thereof, a fluid circuit having a source of varying fluid pressure to produce a flow of fluid therethrough and communicating with said pressure responsive member, a restriction in said circuit exposed to said varying source pressure, valve means including a movable valve member in said circuit cooperating with said restriction for controlling pressure therein acting on said pressure responsive member for effecting movements thereof, said valve member having a portion exposed to said varying pressure and tending to be affected by changes in fluid force produced on said valve portion by variation in said source pressure, sensing means responsive to changes in said controlled condition and providing forces acting on said valve member to effect movements thereof for producing controlled-condition-regulating movements of said pressure responsive member and said control means, a fluid chamber having an aperture therein, a pressure sensitive member associated with said valve member to apply forces acting thereon to compensate in any desired amount for said fluid force changes and disposed within said aperture to comprise a movable portion of a wall of said chamber, means to mount said pressure sensitive member to position same within said aperture to provide a predetermined clearance space between its perimetrical surface and the adjacent surface forming said aperture, said mounting means including substantially frictionless swingable means imparting rigidity in all except one direction and acting to support said pressure sensitive member and to maintain said perimetrical clearance in all operative positions of said member for substantially frictionless movements in said one direction, and pressure-regulator means operatively associated with said control means to regulate said source pressure at predetermined values varying as a function of the position of said control means and tending to correspondingly vary said pressure controlled by said valve member in a direction tending to reverse the movement of said control means, said pressure regulator means including means to maintain said source pressure under all conditions at one said predetermined value corresponding to one definite position of said control means and at another said predetermined value corresponding to another definite position of said control means under all conditions, and so on.

6. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member on one side thereof, valve means in said circuit for controlling pressure therein acting only on said one side of said pressure responsive member for effecting regulating movements thereof, first variable force biasing means opposing the forces of said pressure responsive member produced by said last-named pressure acting thereon, sensing means responsive to changes in the controlled condition to produce forces varying as a function thereof and acting on said valve means to effect movements thereof for causing said controlled-condition-regulating movements of said pressure responsive member and said control means, second variable force biasing means acting on said valve means with a force varying as a function of the position thereof for establishing the operating position of said valve means to establish the desired value of said controlled condition, pressure-regulator means operatively associated with said control means to vary the magnitude of said source-pressure as a function of the position of said control means, said pressure-regulator means including a diaphragm exposed to said source pressure, third biasing means acting on said diaphragm, second valve means in said circuit between said source pressure and said first-named valve means and operated by said diaphragm to correspondingly vary said pressure controlled by said first-named valve means as a function of the position of said control means and in a direction tending to reverse the movement of said control means during stable automatic regulation thereof, said pressure-regulator means including means operatively connected to said control means for causing said second valve means to provide said last-named pressure variation.

7. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member on one side thereof, valve means in said circuit for controlling pressure therein acting only on said one side of said pressure responsive member for effecting regulating movements thereof, first variable force biasing means opposing the forces of said pressure responsive member produced by said last-named pressure acting thereon, sensing means responsive to changes in the controlled condition to produce forces varying as a function thereof and acting on said valve means to effect movements thereof for causing said controlled-condition-regulating movements of said pressure responsive member and said control means, second variable force biasing means acting on said valve means with a force varying as a function thereof for establishing the operating position of said valve means to establish the desired value of said controlled condition, pressure-controlling means including pressure regulator means operatively associated with said control means to vary the magnitude of said source-pressure as a function of the movement of said control means and tending to correspondingly vary said pressure controlled by said valve means in a direction tending to reverse the movement of said pressure responsive member and said control means, re-set means disposed to operatively act on said valve means with a re-set force varying as a function of the position of said control means, and delay means operatively connected to said re-set means and said control means for delaying a change in the amount of said re-set force in response to a change in the position of said control means, whereby the control mechanism is stable at any desired variation of said controlled condition.

8. The combination of means defined in claim 4, and re-set means disposed to operatively act on said valve means with a re-set force varying as a function of the position of said control means, and delay means operatively connected to said re-set means and said control means for delaying a change in the amount of said re-set force in response to a change in the position of said control means, whereby the control mechanism provides stable operation at any desired variation of said controlled condition.

9. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member on one side thereof, valve means including a movable valve member in said circuit for controlling pressure therein acting only on said one side of said pressure responsive member for effecting regulating movements thereof, said valve member in relation to other elements of said valve means being adapted to produce modulated pressures acting on said pressure responsive member to effect movements thereof as a function of the position of said valve member, first biasing means acting on said pressure responsive member with a force varying as a function of the position thereof to oppose the forces produced thereon by said last-named pressure, sensing means responsive to changes in the controlled condition to produce forces varying as a function thereof and acting on said valve means to effect movements thereof for causing said controlled-condition-regulating movements of said pressure responsive member and said control means, second variable force biasing means acting on said valve means with a force varying as a function of the position thereof for establishing the operating position of said valve means to establish the desired value of said controlled condition, pressure-regulator means operatively associated with said control means to regulate said source-pressure at predetermined values varying as a function of the position of said control means and tending to correspondingly vary said pressure controlled by said valve means in a direction tending to reverse the movement of said control means, said pressure-regulator means including means to maintain said source pressure under all conditions at one said predetermined value corresponding to one definite position of said control means and at another said predetermined value corresponding to another definite position of said control means under all conditions, and so on, said valve member having a portion exposed to said varying source pressure and tending to be affected by changes in fluid force produced on said valve portion by variation in said source pressure, a fluid chamber having an aperture therein, and a pressure sensitive member subjected to said source pressure and operatively associated with said valve member to apply forces acting thereon to compensate in any desired amount for said fluid force changes and disposed within said aperture to comprise a movable portion of a wall of said chamber.

10. In a self-regulating control mechanism for automatically controlling a variable condition, the combination of; control means to regulate said controlled condition, a pressure responsive member operatively connected to said control means for actuation thereof, a fluid circuit having a source of varying fluid pressure to produce a flow of fluid therethrough and communicating with said pressure responsive member, a restriction in said circuit exposed to said varying source pressure, valve means including a movable valve member in said circuit cooperating with said restriction for controlling pressure therein acting on said pressure responsive member for effecting movements thereof, said valve member having a portion exposed to said varying source pressure and tending to be affected by changes in fluid force produced on said valve portion by variation in said source pressure, sensing means responsive to changes in said controlled condition and providing forces acting on said valve member to effect movements thereof for producing controlled-condition-regulating movements of said pressure responsive member and said control means, a fluid chamber having an aperture therein, a pressure sensitive member exposed to said source pressure and operatively connected to said valve member to apply forces acting thereon to compensate in any desired amount for said fluid force changes and disposed within said aperture to comprise a movable portion of a wall of said chamber, means to mount said pressure sensitive member to position same within said aperture to provide a predetermined clearance space between its perimetrical surface and the adjacent surface forming said aperture, said mounting means including substantially frictionless swingable leaf spring means imparting rigidity in all except one direction and acting to support said pressure sensitive member and to maintain said perimetrical clearance in all operative positions of said member for substantially frictionless movements in said one direction, said leaf spring means also acting to support said movable valve member for substantially frictionless movements in said one direction by maintaining said supported valve member suspended within the fluid controlled thereby completely free of surface contact other than fluid contact during operational movements thereof, and pressure-regulator means operatively associated with said control means to regulate said source pressure at predetermined values varying as a function of the position of said control means and tending to correspondingly vary said pressure controlled by said valve member in a direction tending to reverse the movement of said control means, said pressure regulator means including means to maintain said source pressure under all conditions at one said predetermined value corresponding to one definite position of said control means and at another said predetermined value corresponding to another definite position of said control means under all conditions, and so on.

11. In a self-regulating control mechanism for automatically controlling a variable condition the combination of; control means to regulate said controlled condition, a pressure responsive member operatively connected to said control means for actuation thereof, a fluid circuit having a source of pressure fluid to produce a flow of fluid therethrough and communicating with said pressure responsive member on one side thereof, valve means including a movable valve member in said circuit for controlling pressure therein acting only on said one side of said pressure responsive member for effecting regulating movements thereof, said valve member in relation to other elements of said valve means being adapted to produce modulated pressures acting on said pressure responsive member to effect movements thereof as a function of the position of said valve member, first biasing means acting on said pressure responsive member with a force varying as a function of the position thereof to oppose the forces produced thereon by said last-named pressure, sensing means responsive to changes in the controlled condition to produce forces varying as a function thereof and acting on said valve means to effect movements thereof for causing said controlled-condition-regulating movements of said pressure responsive member and said control means, second variable force biasing means acting on said valve means with a force varying as a function of the position thereof for establishing the operating position of said valve means to establish the desired value of said controlled condition, and pressure-regulator means including pressure responsive means exposed to said source pressure and operatively associated with said control means to vary the magnitude of said source-pressure as a function of the position of said control means and tending to correspondingly vary said pressure controlled by said valve means in a direction tending to reverse the movement of said control means, said pressure regulator means including means operatively connected to said control means for causing said functional pressure variation.

12. In a self-regulating control mechanism for automatically controlling a variable condition the combination of; control means to regulate said controlled condition, a pressure responsive member operatively connected to said control means for actuation thereof, a fluid circuit having a source of pressure fluid to produce a flow of fluid therethrough and communicating with said pressure responsive member on one side thereof, valve means in said circuit for controlling pressure therein acting only on said one side of said pressure responsive member for effecting regulating movements thereof, said valve means being adapted to produce modulated pressures acting on said pressure responsive member to effect said movements thereof as a function of the position of said valve means, first variable force biasing means opposing the forces of said pressure responsive member produced by said last-named pressure acting thereon, sensing means responsive to changes in the controlled condition to produce forces varying as a function thereof and acting on said valve means to effect movements thereof for causing said controlled-condition-regulating movements of said pressure responsive member and said control means, second variable force biasing means acting on said valve means with a force varying as a function of the position thereof for establishing the operating position of said valve means to establish the desired value of said controlled condition, pressure-regulator means operatively associated with said control means to regulate said source-pressure at predetermined values varying as a function of the position of said control means and tending to correspondingly vary said pressure controlled by said valve means in a direction tending to reverse the movement of said control means, said pressure regulator means including means to maintain said source pressure under all conditions at one said predetermined value corresponding to one definite position of said control means and at another said predetermined value corresponding to another definite position of said control means under all conditions, and so on, re-set means disposed to operatively act on said valve means with a re-set force varying as a function of the position of said control means, delay spring means operatively connected to said control means to produce forces varying as a function of the position thereof, and fluid delay means operatively connected between said re-set means and said delay spring means for transmitting said forces of said delay spring means to said reset means after and lagging behind transient movements of said control means, for delaying a change in the amount of said re-set force in response to a change in the position of said control means.

No references cited.

CLARENCE R. GORDON, *Primary Examiner.*